US008160664B1

(12) United States Patent
Venugopalachary et al.

(10) Patent No.: US 8,160,664 B1
(45) Date of Patent: *Apr. 17, 2012

(54) OMNI-DIRECTIONAL ANTENNA SUPPORTING SIMULTANEOUS TRANSMISSION AND RECEPTION OF MULTIPLE RADIOS WITH NARROW FREQUENCY SEPARATION

(75) Inventors: Rajendran Venugopalachary, Cupertino, CA (US); Senthil Palanisamy, Cupertino, CA (US); Srinath Sarang, Sunnyvale, CA (US); Vaduvur Bharghavan, San Jose, CA (US)

(73) Assignee: Meru Networks, Sunnyvale, CA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 11/294,673

(22) Filed: Dec. 5, 2005

(51) Int. Cl.
*H04M 1/00* (2006.01)

(52) U.S. Cl. ............... 455/575.7; 455/562.1; 455/13.3; 455/19; 455/63.4; 343/799; 343/812; 343/813; 343/827

(58) Field of Classification Search ............... 455/562.1, 455/19, 25, 63.4, 575.7, 13.3, 82–83, 129; 343/799, 812–813, 827
See application file for complete search history.

(56) References Cited

U.S. PATENT DOCUMENTS

| | | | |
|---|---|---|---|
| 3,956,749 A * | 5/1976 | Magorian | 342/147 |
| 5,038,151 A | 8/1991 | Kaminski | |
| 5,125,108 A * | 6/1992 | Talwar | 455/278.1 |
| 5,966,094 A | 10/1999 | Ward et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabassapa et al. | |
| 6,978,158 B2 | 12/2005 | Ghavami | |
| 7,171,215 B2 | 1/2007 | Khouaja et al. | |
| 7,197,308 B2 | 3/2007 | Singhal et al. | |
| 7,277,728 B1 * | 10/2007 | Kauhanen | 455/561 |
| 7,319,685 B2 | 1/2008 | Kim et al. | |
| 7,333,455 B1 | 2/2008 | Bolt et al. | |
| 7,359,362 B2 | 4/2008 | King et al. | |
| 7,400,604 B2 | 7/2008 | Lee et al. | |
| 7,403,506 B2 | 7/2008 | Lee et al. | |
| 7,406,319 B2 | 7/2008 | Kostic et al. | |
| 7,430,397 B2 * | 9/2008 | Suda et al. | 455/7 |
| 7,466,981 B1 | 12/2008 | Abdelmahid et al. | |

(Continued)

FOREIGN PATENT DOCUMENTS

JP        2005311580        11/2005

(Continued)

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — Wayne Cai

(57) ABSTRACT

An omni-directional antenna supporting simultaneous transmission/reception, from the same AP, on multiple frequencies, allowing each AP to communicate using each possible frequency. Each AP multiplexes its outgoing signals onto its transmitting antenna, and de-multiplexes its incoming signals from its receiving antenna. The transmitting and receiving antennae are each substantially located in each other's NULL zone (or one is in the NULL zone of the other). The AP can transmit/receive on many distinct frequencies without needing more antennae.

28 Claims, 4 Drawing Sheets

U.S. PATENT DOCUMENTS

| | | | |
|---|---|---|---|
| 7,515,909 | B2 | 4/2009 | Jain et al. |
| 7,555,287 | B1 | 6/2009 | Heinonen et al. |
| 7,826,426 | B1 | 11/2010 | Bharghavan et al. |
| 2003/0162546 | A1* | 8/2003 | Jordan .................... 455/446 |
| 2003/0206535 | A1 | 11/2003 | Shpak |
| 2003/0207697 | A1 | 11/2003 | Shpak |
| 2003/0207698 | A1 | 11/2003 | Shpak |
| 2003/0207699 | A1 | 11/2003 | Shpak |
| 2003/0236103 | A1* | 12/2003 | Tamaki et al. ............ 455/552.1 |
| 2004/0063455 | A1 | 4/2004 | Eran et al. |
| 2004/0121770 | A1 | 6/2004 | Tigerstedt et al. |
| 2004/0156399 | A1 | 8/2004 | Eran et al. |
| 2004/0185904 | A1* | 9/2004 | Yamakita .................... 455/560 |
| 2005/0054370 | A1 | 3/2005 | Shpak |
| 2005/0122919 | A1 | 6/2005 | Touag |
| 2005/0152314 | A1 | 7/2005 | Sun et al. |
| 2005/0195110 | A1 | 9/2005 | Lin et al. |
| 2005/0220048 | A1 | 10/2005 | Lee et al. |
| 2006/0025127 | A1 | 2/2006 | Cromer et al. |
| 2006/0049987 | A1* | 3/2006 | Herrick .................. 343/700 MS |
| 2006/0111112 | A1 | 5/2006 | Maveddat |
| 2007/0014267 | A1 | 1/2007 | Lam et al. |
| 2007/0213071 | A1 | 9/2007 | Hwang |
| 2008/0102835 | A1 | 5/2008 | Zhao et al. |
| 2008/0153497 | A1 | 6/2008 | Kalhan |
| 2008/0165866 | A1 | 7/2008 | Teo et al. |
| 2008/0212535 | A1 | 9/2008 | Karaoguz et al. |
| 2008/0242305 | A1 | 10/2008 | Kahlert et al. |
| 2008/0287130 | A1 | 11/2008 | Laroia et al. |
| 2009/0022127 | A1 | 1/2009 | Traynor et al. |
| 2009/0061873 | A1 | 3/2009 | Bao et al. |
| 2009/0061879 | A9 | 3/2009 | Gallagher et al. |
| 2009/0111472 | A1 | 4/2009 | Promenzio |

FOREIGN PATENT DOCUMENTS

| | | |
|---|---|---|
| JP | 2006229972 | 8/2006 |

OTHER PUBLICATIONS

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000 (Abstract).

Chen et al. "A Seamless Handoff Mechanism for DHCP-Based IEEE 802.11 WLANS." IEEE Communications Letters, Aug. 2007, pp. 665-667, vol. 1, No. 8.

Cheung et al. "Network Configurations for Seamless Support of CDMA Soft Handoffs Between Cell Clusters." IEEE Journal on Selected Areas in Communications, Sep. 1997, pp. 1276-1278, vol. 15, No. 7.

Chui et al. "An Access Point Coordination System for Improved VoIP/WLAN Handover Performance." IEEE, 2006, pp. 501-505.

Huang et al. "Incorporating AP Selection and Call Admission Control for Seamless Handoff Procedure." Proceedings of the International Conference on Computer and Communication Engineering 2008, 2008, pp. 823-826.

Huang et al. "SAP: Seamless Authentication Protocol for Vertical Handoff in Heterogeneous Wireless Networks." Third International Conference on Quality of Service in Heterogeneous Wired/Wireless Networks, Aug. 7-9, 2006, pp. 1-10, Waterloo, ON, CA.

Kist. "Instant Handoffs for Wireless Infrastructure Meshed Networks." Proceedings of the 2008 Australasion Telecommunication Networks and Applications Conference, 2008, pp. 288-293.

Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.

LV. "Intelligent Seamless Vertical Handoff Algorithm for the Next Generation Wireless Networks." Mobilware '08, Feb. 12-15, 2008, pp. 1-5, Innsbruck, Austria.

Manodham et al. "A Seamless Handoff Scheme with New AP Module for Wireless LANs support VoIP." Proceedings of the 2005 Symposium on Applications and the Internet, 2006, pp. 1-6, IEEE.

Murray et al. "Intelligent Access and Mobility Management in Heterogeneous Wireless Networks Using Policy." ACM First International Workshop on Information and Communication Technologies, 2003, pp. 181-186.

Fan et al. "Managing Heterogeneous Access Networks." 32nd IEEE Conference on Local Computer Networks, 2007, pp. 651-658, IEEE.

Yaakob et al. "An Integration of Mobile Motion Prediction with Dedicated Solicitation Message for Seamless Handoff Provisioning in High Speed Wireless Environment." 2008International Conference on Electronic Design, Dec. 1-3, 2008, pp. 1-5, Pernang, Malaysia.

Wei et al. "Seamless Handoff Support in Wireless Mesh Networks." 2006, pp. 1-8, IEEE.

Zhou et al. A Seamless Handoff Scheme for Mobile IP.' IEEE Vehicular Technology Conference, 2006, pp. 927-931, vol. 2.

Amir. "Fast Handoff for Seamless Wireless Mesh Networks." MobiSys '06, Jun. 19-22, 2006, pp. 83-95, ACM, Uppsala, Sweden.

IEEE. "Part 11: Wireless LAN Medium Access Control (MAC) and Physical Layer (PHY) Specifications." IEEE Std 802.11-1997, Nov. 18, 1997, pp. i-445.

IEEE. "Part 11: Wireless LAN Medium Access Control (MAC) and Physical Layer (PHY) Specifications." IEEE Std 802.11, 1999 Edition (R2003), pp. i-513.

Kitahara. "A Base Station Adaptive Antenna for Downlink Transmission in a DS-CDMA System." IEEE 51st Vehicular Technology Conference Proceedings, 2000 (Abstract).

Mahler et al. "Design and Optimisation of an Antenna Array for WiMAX Base Stations." IEEE/ACES International Conference on Wireless Communications and Applied Computational Electromagnetics, 2005 (Abstract).

Ponnappali et al. "Desing and Packaging of Antennas for Wireless Systems." Proceedings of Electrical Performance of Electrical Packaging, 1995 (Abstract).

Sarolic. "Base Station Antenna Near-Field Radiation Pattern Distortion Analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

OMNI-DIRECTIONAL ANTENNA SUPPORTING SIMULTANEOUS TRANSMISSION AND RECEPTION OF MULTIPLE RADIOS WITH NARROW FREQUENCY SEPARATION

BACKGROUND OF THE INVENTION

In wireless communication, devices send and receive messages without being physically coupled. Wireless devices can include portable computers, telephones, location sensors (such as those using GPS), and the like. Portable computers with wireless communication capability can be coupled to a computer network, such as the Internet or the World Wide Web. The IEEE 802.11 standard (including 802.11a, 802.11b, and 802.11g) is one known technique for coupling wireless devices to a computer network. In 802.11, wireless devices seek out and select "access points" (herein sometimes called "AP's"), which are themselves physically coupled, for computer communication, to at least a network controller. Each wireless device associates itself with a particular AP, with which it communicates. Each wireless device (which might be moving) determines from time to time if it has good communication with its associated AP, and whether it would have better communication with a different AP. Each AP might be coupled to a single device, a collection of devices, or to a computer network.

In any of these cases, the known art exhibits several problems.

A $1^{st}$ problem is that multiple wireless devices might contend for communication through the AP. This might constrict the wireless devices and AP's from using their full communication ability. This might cause some wireless devices to obtain more or better communication service than others. This might reduce the ability of AP's to provide QoS (quality of service) guarantees that are needed for some uses of wireless devices, such as VoIP (voice over Internet Protocol) and other voice or video applications.

A $2^{nd}$ problem is that handoff (deassociating a wireless device from a $1^{st}$ AP, and associating that wireless device with a $2^{nd}$ AP) can take substantial time in relation to the communication. Similar to the $1^{st}$ problem, this might constrict the wireless devices and AP's from using their full communication ability. Similar to the $1^{st}$ problem, this might reduce the ability of AP's to provide QoS guarantees that are needed for some uses of wireless devices, such as VoIP and other voice or video applications.

A $3^{rd}$ problem is that access points currently support only 1 or 2 channels and access points on different channels in the same frequency band typically cannot be co-located. If 2 channels are supported, they are in different frequency bands, i.e. one on 2.4 GHz and one on 5 GHz, to prevent cross-channel interference. Therefore, any handoff must be spatial, i.e., from a $1^{st}$ AP to a spatially separated $2^{nd}$ AP. For example, since access points must be kept at some minimum distance from each other, handoff from channel 1 to channel 6 on the same AP and location cannot occur. Spatial handoff is much more difficult to optimize than handing off across channels in the same location to a multi-frequency access point.

SUMMARY OF THE INVENTION

The invention includes a substantially omni-directional antenna, with which a wireless communication system can support simultaneous transmission and reception, from multiple radios from many AP's, on multiple frequencies. The multi-frequency access points of the present invention have one or multiple radios. Each radio might operate on a single narrow-band frequency, but the antenna includes a broadband antenna capable of multiplexing/de-multiplexing multiple frequencies. In a wireless communication system as further described in the Incorporated Disclosure, each AP is intended to be capable of communicating on each possible frequency, with the effect that wireless devices can access the wireless communication system using every frequency, everywhere.

The invention provides each radio of an AP this capability without any pair of radios of the AP interfering with each other's signals, using a pair of antennae, one for trans-mining and one for receiving. In a substantially omni-directional region, each AP multiplexes its outgoing signals onto a transmitting antenna, and de-multiplexes its incoming signals from a receiving antenna. The transmitting antenna (or antennae if there is more than one substantially omni-directional, e.g., overlapping, antenna) and the receiving antenna are each substantially located in a NULL zone of each other's transmission/reception region. Alternatively, the transmit antenna can be in a NULL zone of the reception antenna, or the reception antenna can be in a NULL zone of the transmit antenna. This has the effect that the many radios of an AP can transmit and receive substantially simultaneously without interference, e.g., a radio of an AP can transmit while another radio of the AP can receive, on a relatively large number of distinct frequencies and without needing more than one transmitting antenna and one receiving antenna.

As described below, one set of preferred embodiments includes a single pair of transmitting antennae facing in opposite directions, adjacent to a single pair of receiving antennae also facing in opposite directions, with the effect that the transmitting antennae and the receiving antennae are each substantially located in a NULL zone of each other's transmission/reception region. This has the effect that the two radios of an AP can transmit and receive substantially simultaneously without interference, e.g., a radio of an AP can transmit while a second radio of the AP can receive, each using different frequencies. In this set of embodiments, the transmitting/receiving antennae each include a patch transmission/reception element. This set of embodiments also preferably uses separate transmitting/receiving antennae for two separate spectral zones IEEE 802.11 uses, one for channels in 2.4 GHz ISM band and one for channels in 5 GHz UNI-I, UNI-II and UNI-III bands.

As described below, another set of preferred embodiments includes a substantially omni-directional transmitting antenna (such as a polar antenna) disposed within a substantially surrounding set of substantially unidirectional receiving antennae (such as patch antennae forming a square or hexagon). This has the effect that the receiving antennae, being substantially unidirectional, do not receive signals sent from the transmitting antenna. (The transmitting antenna can "receive" signals directed to the receiving antennae; however, this typically does not matter because, typically, no receiving circuitry would be connected to the transmitting antenna.) In this set of embodiments, the transmitting antenna includes substantially polar transmitting elements, while the receiving antennae each include reception elements.

DETAILED DESCRIPTION OF THE PREFERRED EMBODIMENT

Generality of the Description

Figure 1:
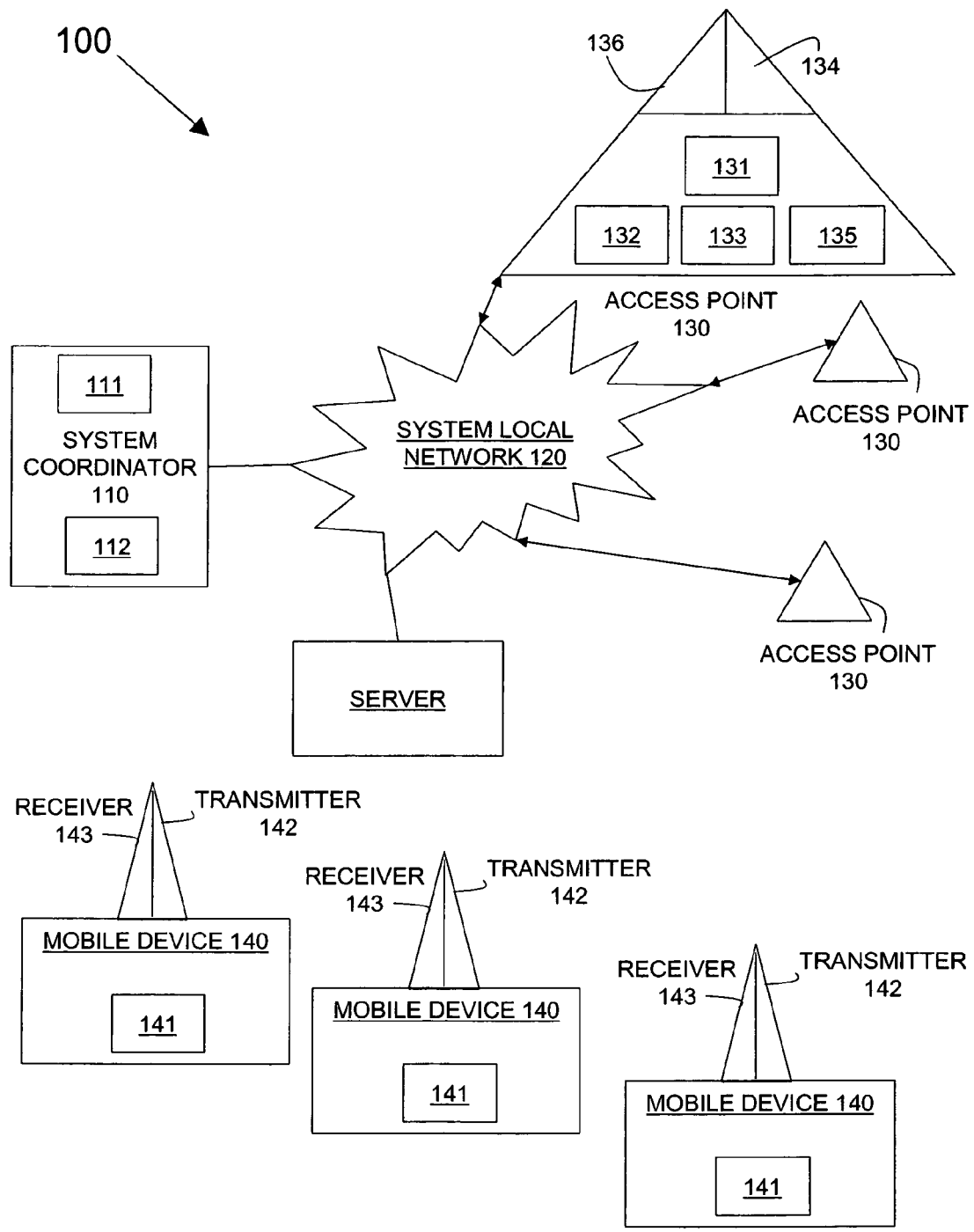
FIG. 1 shows a block diagram of a wireless communication system including access points and mobile devices.

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that those structures or techniques would be preferred in all circumstances.

References to 1$^{st}$ reasons for using particular structures or techniques do not preclude other reasons or other structures or techniques, even if completely contrary, where circumstances would indicate that the 1$^{st}$ reasons and structures or techniques are not as compelling. In general, the invention includes those other reasons or other structures or techniques, especially where circumstances indicate they would achieve the same effect or purpose as the 1$^{st}$ reasons or structures or techniques.

After reading this application, those skilled in the art would see the generality of this description.

Definitions

The general meaning of each of these terms or phrases is intended to be illustrative, and in no way limiting.

The phrase "access point", the term "AP", and the like, generally refer to devices capable of wireless communication with mobile devices, and capable of wireline communication with other devices. In preferred embodiments, AP's communicate with external devices using a L2/L3 network. However, in the context of the invention, there is no particular requirement that AP's have an actual wireline communication link; AP's might communicate entirely wirelessly.

The phrase "multiple radio", and the like, generally refers to devices capable of wireless communication with mobile devices while using multiple antennae, frequencies, or both.

The phrase "L2/L3 network", and the like, generally refers to a communication network in which data packets are transmitted in accordance with the ISO/OSI model. In preferred embodiments, an L2 network includes a LAN, such as an Ethernet-type LAN, while an L3 network includes a packet-switched network, such as multiple LAN's coupled using bridges or routers. However, as noted below, in the context of the invention, where an L2/L3 network is described there is no particular requirement for any particular type of network, whether designated as an L2/L3 network or otherwise.

The phrases "mobile device", "wireless device", and the like, generally refer to devices capable of wireless communication with AP's. In preferred embodiments, wireless devices implement a wireless communication standard such as IEEE 802.11a, 11b, or 11g. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use inter-compatible communication standards.

The phrase "wireless communication", and the like, generally refers to radio communication in a region of spectrum allocated for that purpose, or for unlicensed use. In preferred embodiments, wireless communication includes a wireless communication standard such as IEEE 802.11a, 11b, or 11g. However, in the context of the invention, there is no particular requirement that wireless communication must necessarily (1) use radio spectrum, (2) use electromagnetic communication, or even (3) be entirely confined to untethered communication coupling.

System Elements

FIG. 1 shows a block diagram of a wireless communication system including access points and mobile devices.

Communication System

One embodiment of a wireless communication system 100 includes elements shown in the figure, including at least a system coordinator 110, a system local network 120, a set of access points ("AP's") 130, and a set of mobile devices 140.

The system coordinator no includes elements shown in the figure, including at least a coordinator circuit in and a coordinator database 112. The coordinator circuit 111 includes a computing device, such as a processor, program and data memory, and optionally mass storage. In cases in which the coordinator circuit 111 includes a programmable computing device, it also operates under control of software, optionally distinguished as operating system software and application software. The coordinator database 112 includes information relating to the status of the system 100, its AP's 130, and its mobile devices 140. The coordinator circuit in operates with the coordinator database 112 to perform functions described below.

The system local network 120 includes any technique for sending and receiving information between the system coordinator 110 and the AP's 130. In a 1$^{st}$ set of preferred embodiments, the system local network 120 includes an L2/L3 network, capable of substantially reliably communicating data packets between the system coordinator 110 and the AP's 130. However, in the context of the invention, there is no particular requirement for using this technique.

Each mobile device 140 includes elements shown in the figure, including at least a device control circuit 141, a transmitter 142, and a receiver 143. In a 1$^{st}$ set of preferred embodiments, the device control circuit 141 includes a computing device preprogrammed to implement one or more of the IEEE 802.11a, 11b, or 11g protocols, and includes one or multiple radios. One example of a mobile device could be a telephone or mobile computer preprogrammed to operate in a wireless environment. However, in the context of the invention, there is no particular requirement that the device control circuit 141 must be preprogrammed; it may instead include programmable memory, data memory, and optionally mass storage. One example of this distinct type of mobile device could be a mobile computer programmable to discover its wireless environment and operate therein.

Access Points

In a preferred embodiment, each access point (AP) 130 includes elements shown in the figure, including at least an AP control circuit 131, an AP control database 132, a transmit multiplexer 133, a transmit antenna 134, a receive de-multiplexer 135, and a receive antenna 136.

The AP control circuit 131 includes a computing device, such as a processor, program and data memory, and optionally mass storage. In cases in which the AP control circuit 131 includes a programmable computing device, it also operates under control of software, optionally distinguished as operating system software and application software.

The AP control database 132 includes information relating to the status of the system 100, the particular AP 130, and those mobile devices 140 assigned to that AP 130. The AP control circuit 131 operates with the AP control database 132 to perform functions described below.

The AP control circuit 131 determines which signals it desires to send and on what frequencies, and sends that information to the transmit multiplexer 133. The transmit multiplexer 133 causes those signals to be multiplexed onto those frequencies and coupled to the transmit antenna 134 using one or more radios. This system allows clients to associate with one frequency, as well as allowing client devices that support "channel bonding", i.e., can support multiple frequencies simultaneously. After reading this application, those skilled in the art will realize that the transmit antenna 134 is capable of sending a multiplexed signal including information to be received at distinct mobile devices 140, each using its own receiving frequency.

The transmit antenna 134 transmits the multiplexed signal, substantially omnidirectionally, with the effect that all mobile devices 140 within reception range of the AP 130 will hear that signal.

The receive antenna 136 receives all signals communicated in the region local to the AP 130 (whether intended for the AP 130 or not), and couples those signals to the receive de-multiplexer 135 using one or more radios. After reading this application, those skilled in the art will realize that the receive antenna 136 is capable of receiving a signal that has been multiplexed by virtue of one or more of (1) a local AP 130 having sent a multiplexed signal, or (2) a set of distinct senders, possibly including either AP's 130, or mobile devices 140, or both, sending signals on multiple frequencies, which are then received as a multiplexed signal.

The receive de-multiplexer 135 causes the multiplexed signals from the receive antenna 136 to be separated into their frequency-modulated information components, and couples those information components to the AP control circuit 131.

After reading this application, those skilled in the art will realize that combined operation of the AP control circuit 131, the transmitter multiplexer 133, the transmit antenna 134, the receive de-multiplexer 135, and the receive antenna 136, have the effect that the AP 130 can transmit or receive on any of its available frequencies. It is desirable for the AP 130, when sending and receiving, to not have its own transmission interfere with its own reception.

Patch Transmit/Receive Antennae

Figure 2:
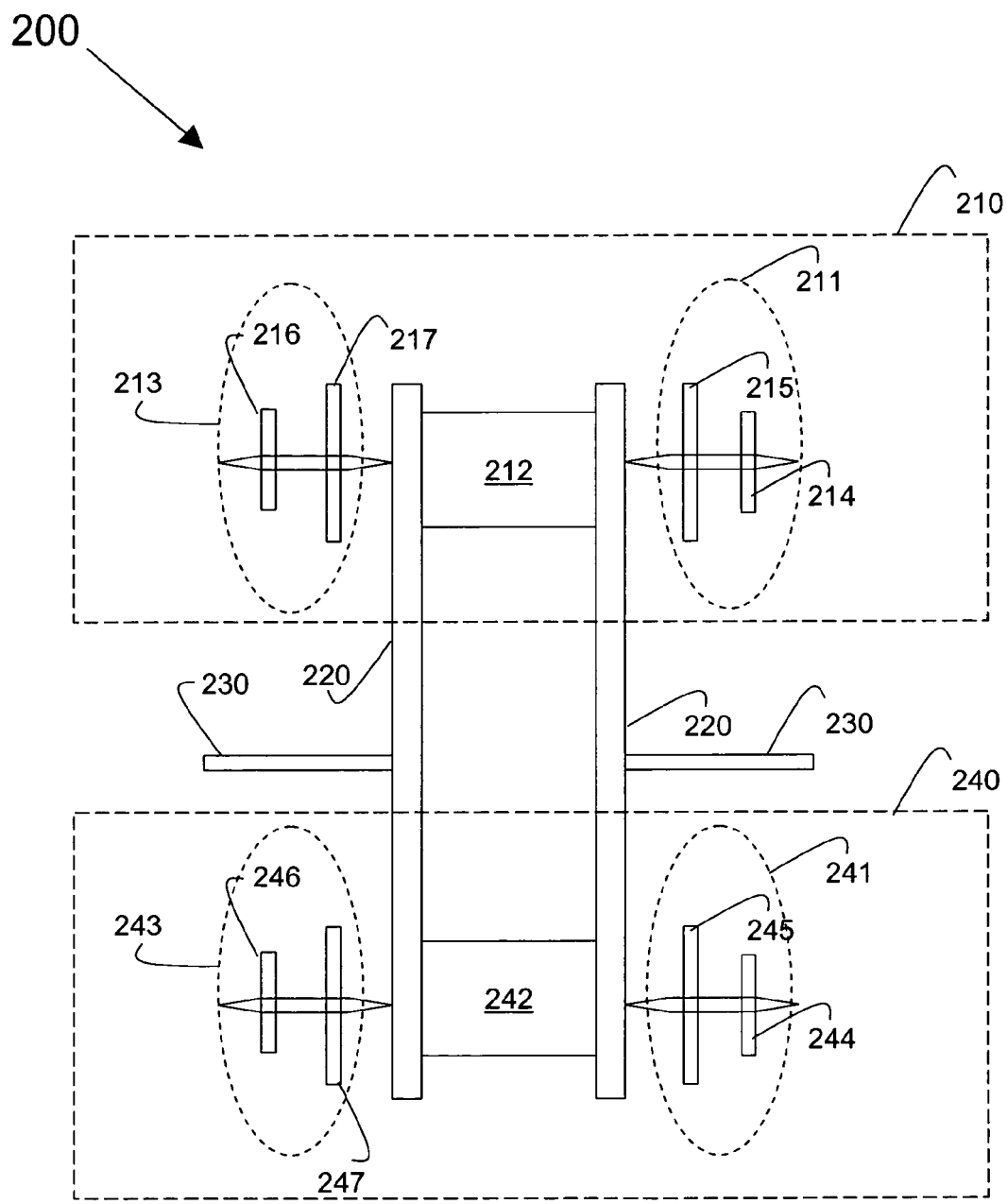
FIG. 2 shows a design diagram of a $1^{st}$ antenna for use with a wireless communication system including access points and mobile devices.

FIG. 2 shows a design diagram of a $1^{st}$ antenna for use with a wireless communication system including access points and mobile devices.

In a $1^{st}$ set of preferred embodiments, an antennae assembly 200 includes a combined transmit antenna 210 and a combined receive antenna 240. The combined transmit antenna 210 includes a right transmit antenna 211 and a left transmit antenna 213 coupled to a transmit antennae combiner 212. In preferred embodiments, the right transmit antenna 211 further includes a 5 GHz patch antenna 214 and a 2.4 GHz patch antenna 215. Similarly, the left transmit antenna 213 further includes a 5 GHz patch antenna 216 and a 2.4 GHz patch antenna 217. The patch antennae might be sheet metal antennae, although this is not required.

The combined receive antenna 240 includes a right receive antenna 241 and a left receive antenna 243, coupled to a receive antenna combiner 242. In preferred embodiments, the right receive antenna 241 further includes a 5 GHz patch antenna 244 and a 2.4 GHz patch antenna 245. Similarly, the left receive antenna 243 further includes a 5 GHz patch antenna 246 and a 2.4 GHz patch antenna 247. The patch antennae might be sheet metal antennae, although this is not required.

A set of ground planes 220 might be shared by the antennae. A set of antennae isolators 230 preferably suppress cross-channel interference between the antennae.

In these embodiments, the combined transmit antenna 210 is placed in a NULL coverage zone of the combined receive antenna 240. Similarly, the combined receive antenna 240 is placed in a NULL coverage zone the combined transmit antenna 210. Alternatively, the transmit antenna can be in a NULL zone of the reception antenna, or the reception antenna can be in a NULL zone of the transmit antenna, which has a similar effect (i.e., the receive antenna cannot "hear" the transmit antenna).

Alternative Patch Transmit/Receive Antennae

After reading this application, those of ordinary skill will realize that each of the patch antennae, including the right transmit antenna 211, the left transmit antenna 213, the right receive antenna 241, and the left receive antenna 243, need not be constructed using only a single patch antenna. Any set of them, whether one of them, or several of them, or all of them, might be replicated, with the replicate disposed proximate to the original.

For one example, the antennae assembly 200 might include a right transmit antenna having two parts 211a and 221b, where each of those two parts are similar to the right transmit antenna 211 described above, and where those two parts are disposed proximate to each other. Similarly, the antennae assembly 200 might include a left transmit antenna similarly having two parts 213a and 213b, a right receive antenna having two parts 241a and 241b, and a left receive antenna having two parts 243a and 243b.

After reading this application, those of ordinary skill will realize that replication of one, some, or all of the patch antennae provides for antennae diversity, with the effect of providing support for 802.11n. In the context of the invention, there is no particular requirement that if one patch antenna is replicated, that any others need be.

Alternative Use of Transmit/Receive Antennae

The antennae assembly 200 might alternatively be used as an analog (or digital) signal repeater, with the effect of providing improved signal to noise ratio between an AP and a mobile device. More generally, the antennae assembly 200 might also be used as an analog (or digital) signal repeater, with the effect of providing improved signal to noise ratio between any sender(s) and receiver(s).

In an alternative use of the antennae assembly 200, the left receive antenna 243 receives signals, such as from an AP 130, couples those signals to a left-to-right amplifier 151, which amplifies those signals and couples them to the right transmit antenna 211, which transmits the amplified signals, such as to a mobile device 140. The left-to-right amplifier 151 might include an analog amplifier, which is preferred, or might include a digital receiver and retransmitter.

Similarly, the right receive antenna 241 receives signals, such as from a mobile device 140, couples those signals to a right-to-left amplifier 152, which amplifies those signals and couples them to the left transmit antenna 213, which transmits the amplified signals, such as to an AP 130. The right-to-left amplifier 153 might include an analog amplifier, which is preferred, or might include a digital receiver and retransmitter.

Omni-Directional Transmit, Patch Receive Antennae

Figure 3:
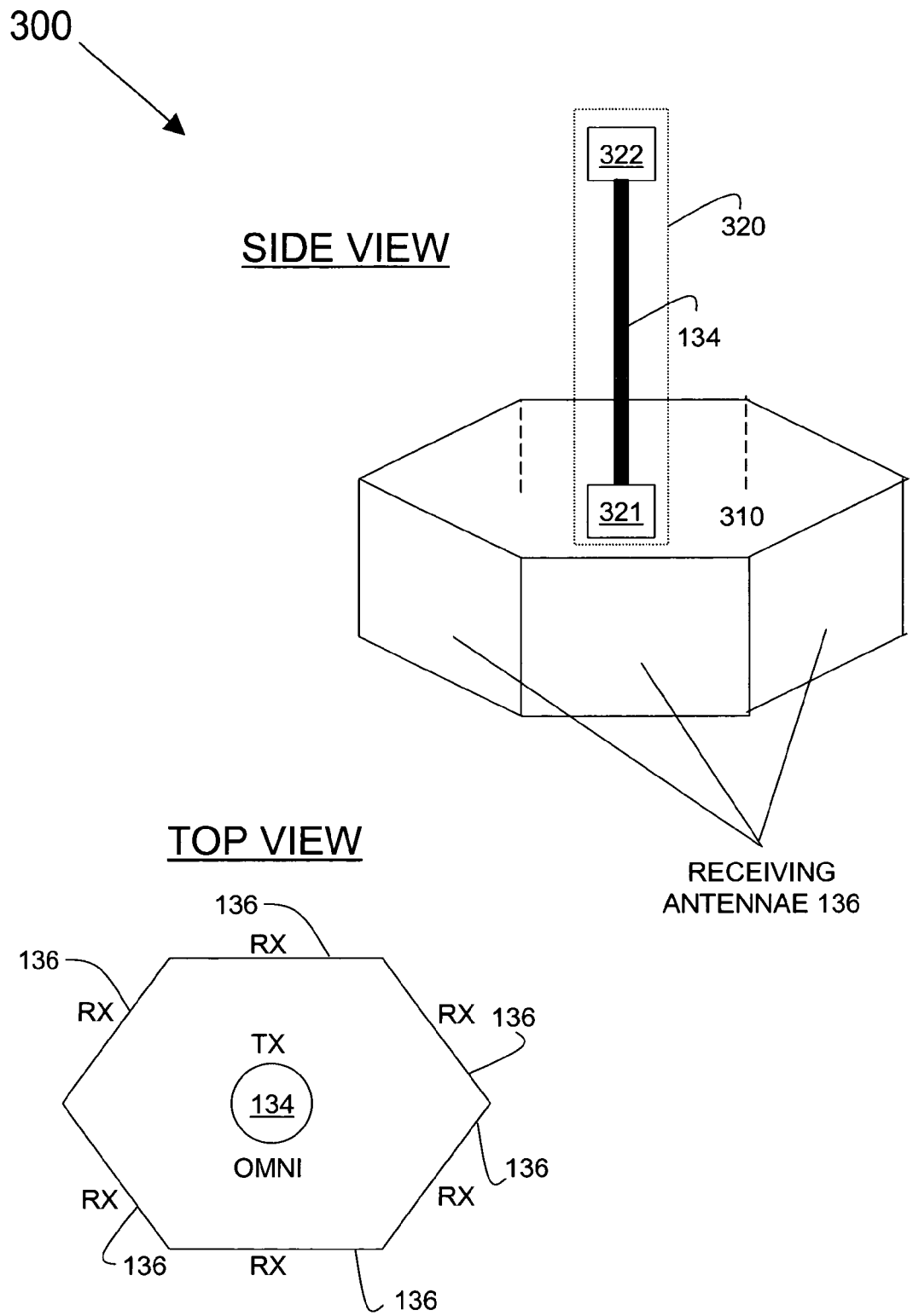
FIG. 3 shows a design diagram of a 2$^{nd}$ antenna for use with a wireless communication system including access points and mobile devices.

FIG. 3 shows a design diagram of a $2^{nd}$ antenna for use with a wireless communication system including access points and mobile devices.

In a $2^{nd}$ set of preferred embodiments, an assembly 300 of the transmit antenna 134 and a set of receiving antennae 136 has greater radial symmetry. The assembly 300 includes the transmit antenna 134, centrally disposed, and the set of receiving antennae 136, radially disposed with the effect of enclosing the transmit antenna 134 in a substantially enclosed region 310.

While the preferred embodiments describe omni-directional antennae, the present invention also supports directional antennae with flexible configurations for directional gain, azimuth, and vertical coverage patterns.

The transmit antenna 134 includes a substantially omni-directional transmitting antenna, such as a polar antenna 320 having a base 321 and a tip 322, and disposed within the enclosed region 310. An antenna isolator might be included and suppress cross-channel interference.

A substantially surrounding set of receiving antennae 136 define the enclosed region 310. This has the effect that the enclosed region 310 includes an interior 311, in which the transmit antenna 134 is disposed, and a substantially ring-shaped enclosure 312, the latter including the set of receiving antennae 136 disposed near each other.

The set of receiving antennae 136 each include a patch active plate, with the effect that the enclosure 312 receives those signals incoming to the assembly 300, and with the effect that the transmit antenna 134 does not receive those signals. Thus, the transmit antenna 134 is within a NULL zone for the set of receiving antennae 136.

Similarly, the transmit antenna 134 sends its signals through an inactive side of the receiving antennae 136, with the effect that the receiving antennae 136 do not receive those signals. Thus, the receiving antennae 136 are each within a NULL zone for the transmit antenna 134.

Alternatively, the transmit antenna can be in a NULL zone of the reception antenna, or the reception antenna can be in a NULL zone of the transmit antenna, which has a similar effect (i.e., the receive antenna cannot "hear" the transmit antenna).

Figure 4:
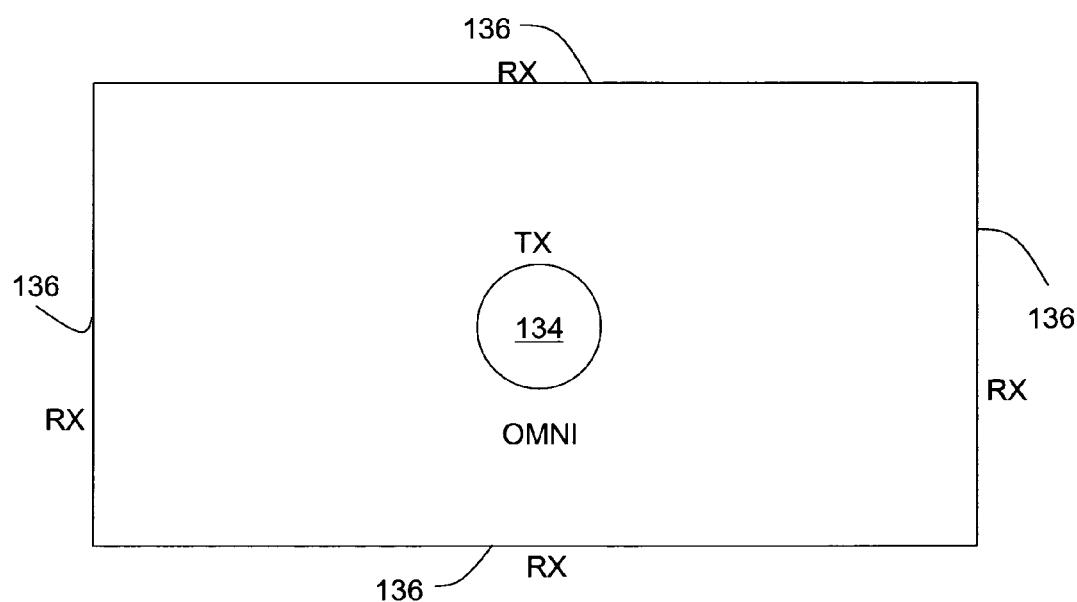
FIG. 4 shows a square variation of the antenna shown in FIG. 3.

The enclosure 312 might form any reasonable polygon; either a square or a hexagon is preferred. FIG. 3 shows an example of a square arrangement, and FIG. 4 shows an example of a square arrangement. The invention is not limited to these examples.

Dual Omni-Directional Transmit/Receive Antennae

In one embodiment, the AP control circuit 131 is a dual AP control circuit 131 that determines which signals it desires to send and on what frequencies, and sends to the transmit antenna 134 through two ports of the antenna. After reading this application, those skilled in the art will realize that the transmit antenna 134 is capable of sending two signals including information to be received at distinct mobile devices 140, each using its own receiving frequency.

The signals received by the receive antenna 136 may be received by the transmit antenna 134. The signals transmitted by the transmit antenna 134 are not received by the receive antenna 136. In one embodiment of the invention, the transmit antenna 134 is in a NULL zone of the receive antenna 136, but the receive antenna 136 is not in a NULL zone of the transmit antenna 134. In another embodiment, the antennae are in each other's NULL zone.

The transmit antenna 134 transmits the two signals, substantially omni-directionally, with the effect that all mobile devices 140 within reception range of the AP 130 will hear that signal.

The receive antenna 136 receives all signals communicated in the region local to the AP 130 (whether intended for the AP 130 or not). After reading this application, those skilled in the art will realize that the receive antenna 136 is capable of receiving a signal that has been multiplexed by virtue of either (1) a local AP 130 having sent a signal, or (2) a set of distinct senders, possibly including either AP's 130, or mobile devices 140, or both, sending signals on multiple frequencies, which are then received as a multiplexed signal.

After reading this application, those skilled in the art will realize that combined operation of the dual AP control circuit 131, the transmit antenna 134, and the receive antenna 136, have the effect that the AP 130 can transmit or receive on any two of its available frequencies. It is desirable for the AP 130, when sending and receiving, not to have its own transmission interfere with its own reception.

Co-Located Radio Deployment and Multi-Channel Planning

After reading this application, one skilled in the art will appreciate that the foregoing antennae permit co-location of radios, with plural co-located radios for an AP broadcasting or receiving on their own transmit and receive antennas in the same overall antenna. The isolation and NULL zones discussed above tends to limit interference between the radios.

In addition, after reading this application, one skilled in the art will appreciate that the foregoing antennae permit multi-channel planning, with radio(s) broadcasting on multiple channels co-located on the same overall antenna (including transmit and receive antennae). Thus, multiple channels for each frequency band (e.g., 2.4 GHz and 5.0 GHz) can be placed on each antenna. The same isolation and NULL zones that limit interference between radio bands likewise tends to limit interference between channels.

Non-Spatial Handoff

After reading this application, one skilled in the art will also appreciate that these antenna designs permit non-spatial handoff. In particular, these designs have the effect of permitting co-location of radios and channels, with the effect that handoff can occur within a spatial area service by a single AP, for example from one radio to another, from one band to another, or from one channel to another.

Collision Detection

After reading this application, one skilled in the art will further appreciate that these antenna designs have the effect of permitting collision detection within an area serviced by an AP. In particular, by "listening" to signals on co-located radios, bands, or channels, AP control circuit 131 can detect collisions that are likely to occur if a handoff occurs from one radio, band, or channel to another. In such case, the AP control circuit can take remedial action (e.g., changing a radio, band, or channel for a signal) before a collision occurs. An effect of this is that in some instances, problems associated with collisions can be avoided.

Generality of the Invention

This invention should be read in the most general possible form. This includes, without limitation, the following possibilities included within the scope of, or enabled by, the invention.

As described above, the invention provides an enabling technology, by which AP's have the capability to each use multiple frequencies, even to the extent where each AP uses each frequency.

&Communication throughput using AP's can be substantially increased, much closer to the maximum theoretical capacity in the case where each AP uses the entire available wireless spectrum.

• Handoff of wireless devices from a 1$^{st}$ AP to a 2$^{nd}$ AP can be substantially sped up, much closer to the minimum theoretical time for the system to find a superior AP for a moving wireless device, and to reassign that wireless device to a new AP.

• Handoffs between frequencies on a same access point are enabled.

• Alternative embodiments are also applicable to non-802.11 protocols, and are particularly useful in environments where the digital protocol involves commutativity of channels between transmitter and receiver.

• Alternative embodiments also apply to directional antennae and can support flexible antenna configurations, i.e., directional antennae, sectorized antennae, antennae with different azimuth patterns, antennae with different vertical patterns, and the like.

• Alternative embodiments provide for deployment of co-located AP's that support multiple frequencies. This has the effect of providing for better handoff, with the effect of making deployment much easier. Optimization occurs primarily across frequencies and not across both frequencies and substantially spatial distances.

• Alternative embodiments provide for simultaneous optimization of both peak and aggregate throughput; there is no requirement for frequency planning across access points.

• Alternative embodiments support different radios having different transmit power and receive power, with the effect of providing different coverage planning on different channels.

• Alternative embodiments provide for radios to perform collision detection in a broadcast wireless medium. With the 802.11 packet handshake detecting frame-level collision, the invention provides for reception on the same channel while transmitting, with the effect that recovery from collisions is relatively faster.

• Alternative embodiments provide for use of CSMA/CD protocols as well as CSMA/CA protocols.

• Alternative embodiments include 2 broadband antennae rather than N narrow-band antennae.

• Alternative embodiments provide for antennae that are deployed and coupled, e.g., using backhauling, to AP's that might be relatively non-local.

After reading this application, those skilled in the art would see the generality of this application.

The invention claimed is:

1. A method, including steps of
substantially simultaneous transmission and reception by substantially co-located multiple radios;
sending signals to a transmission antenna having a relatively small NULL coverage zone;
receiving signals from a reception antenna having a relatively small NULL coverage zone;
wherein
the transmission antenna is disposed parallel to a maximum power reception region of said reception antenna in the NULL coverage zone of the reception antenna, the reception antenna is disposed parallel to a maximum power reception region of said reception antenna in the NULL coverage zone of the transmission antenna, or both; and
the NULL coverage zone of the transmission antenna includes a finite region of substantially zero signal strength at substantially the same polarity as said transmission antenna, the NULL coverage zone of the reception antenna includes a finite region of substantially zero signal strength at substantially the same polarity as said reception antenna, or both;
wherein the transmission antenna further comprises a pair of transmission antennae;
wherein said maximum power transmission regions of said transmission antennas face in substantially 180 degree opposite directions from each other.

2. A method as in claim 1, wherein separate radios are connected to each transmission antenna, thereby co-locating the radios at an access point.

3. A method as in claim 2, further comprising the step of performing a non-spatial handoff between the separate radios.

4. A method as in claim 1, wherein separate channels are connected to each antenna, thereby co-locating channels at an access point.

5. A method as in claim 1, wherein the transmission antenna further comprises a pair of transmission antennae each including a patch transmission element, the reception antenna further comprises a pair or reception antennas each including a patch transmission element, and the transmission patch elements are disposed parallel and adjacent to the reception patch elements.

6. A method as in claim 1, wherein
the transmission antenna is omni-directional and disposed with a transmission power region substantially including a plane,
the reception antenna is unidirectional and disposed with a reception power region substantially including said plane, and
the transmission antenna is disposed within a set of unidirectional reception antenna including the reception antenna substantially surrounding said transmission antenna in said plane.

7. A method as in claim 6, wherein said surrounding set of unidirectional reception antenna form a square.

8. A method as in claim 6, wherein said surrounding set of unidirectional reception antenna form a hexagon.

9. A method as in claim 6, wherein the transmission antenna comprises polar transmitting elements.

10. A method as in claim 9, wherein the reception antenna comprises polar reception elements.

11. A method as in claim 10, wherein the antennae co-locate multiple channels, radios, or channels and radios.

12. A method as in claim 1, wherein the transmission and reception antennae each includes a plurality of patch antennae disposed proximately and each disposed substantially parallel to a transmit/receive axis.

13. A method, including steps of
substantially simultaneous transmission and reception by substantially co-located multiple radios;
sending signals to a transmission antenna having a relatively small NULL coverage zone;
receiving signals from a reception antenna having a relatively small NULL coverage zone;
wherein
the transmission antenna is disposed parallel to a maximum power reception region of said reception antenna in the NULL coverage zone of the reception antenna, the reception antenna is disposed parallel to a maximum power reception region of said reception antenna in the NULL coverage zone of the transmission antenna, or both; and
the NULL coverage zone of the transmission antenna includes a finite region of substantially zero signal strength at substantially the same polarity as said transmission antenna, the NULL coverage zone of the reception antenna includes a finite region of substantially zero signal strength at substantially the same polarity as said reception antenna, or both;

wherein the reception antenna further comprises a pair of reception antennae;

wherein said maximum power reception regions of said reception antennas face in substantially 180 degree opposite directions from each other.

14. A method as in claim 13, further comprising the step of detecting collisions and possible collisions between signals on the reception antennae.

15. Apparatus including a multiplexer coupled to a transmission antenna having a relatively small NULL coverage zone;

a de-multiplexer coupled to a reception antenna having a relatively small NULL coverage zone;

wherein the transmission antenna is disposed parallel to a maximum power reception region of said reception antenna in the NULL coverage zone of the reception antenna, the reception antenna is disposed parallel to a maximum power transmission region of said transmission antenna in the NULL coverage zone of the transmission antenna, or both; and the reception antenna's NULL coverage zone includes a finite region of substantially zero signal strength at substantially the same polarity as said reception antenna, the transmission antenna's NULL coverage zone includes a finite region of substantially zero signal strength at substantially the same polarity as said transmission antenna, or both;

wherein the transmission antenna further comprises a pair of transmission antennas;

wherein said maximum power transmission regions of said transmission antennas face in substantially 180 degree opposite directions from each other.

16. Apparatus as in claim 15, wherein separate radios are connected to each transmission antenna, thereby co-locating the radios at an access point.

17. Apparatus as in claim 16, further comprising the step of performing a non-spatial handoff between the separate radios.

18. Apparatus as in claim 15, wherein separate channels are connected to each antenna, thereby co-locating channels at an access point.

19. Apparatus as in claim 15, wherein the transmission antenna further comprises a pair of transmission antennas each including a patch transmission element, the reception antenna further comprises a pair of reception antennas each including a patch transmission element, and the transmission patch elements are disposed parallel and adjacent to the reception patch elements.

20. Apparatus as in claim 15, wherein the transmission antenna is omni-directional and disposed with a transmission power region substantially including a plane, the reception antenna is unidirectional and disposed with a reception power region substantially including said plane, and wherein the transmission antenna is disposed within a set of unidirectional reception antenna including the reception antenna substantially surrounding said transmission antenna in said plane.

21. Apparatus as in claim 20, wherein said surrounding set of unidirectional reception antenna form a square.

22. Apparatus as in claim 20, wherein said surrounding set of unidirectional reception antenna form a hexagon.

23. Apparatus as in claim 20, wherein the transmission antenna comprises polar transmitting elements.

24. Apparatus as in claim 23, wherein the reception antenna comprises polar reception elements.

25. Apparatus as in claim 24, wherein antennae co-locate multiple channels, radios, or channels and radios.

26. Apparatus as in claim 15, wherein the transmission and reception antennae each includes a plurality of patch antennae disposed proximately and each disposed substantially parallel to a transmit/receive axis.

27. Apparatus including a multiplexer coupled to a transmission antenna having a relatively small NULL coverage zone;

a de-multiplexer coupled to a reception antenna having a relatively small NULL coverage zone;

wherein the transmission antenna is disposed parallel to a maximum power reception region of said reception antenna in the NULL coverage zone of the reception antenna, the reception antenna is disposed parallel to a maximum power transmission region of said transmission antenna in the NULL coverage zone of the transmission antenna, or both; and the reception antenna's NULL coverage zone includes a finite region of substantially zero signal strength at substantially the same polarity as said reception antenna, the transmission antenna's NULL coverage zone includes a finite region of substantially zero signal strength at substantially the same polarity as said transmission antenna, or both;

wherein the reception antenna further comprises a pair of reception antennas;

wherein said maximum power reception regions of said reception antennas face in substantially 180 degree opposite directions from each other.

28. Apparatus as in claim 27, further comprising a control circuit that detects collisions and possible collisions between signals on the reception antennae.

\* \* \* \* \*